(12) United States Patent
Hammad et al.

(10) Patent No.: US 10,153,497 B2
(45) Date of Patent: Dec. 11, 2018

(54) MODULAR ELECTROCHEMICAL CELL AND STACK DESIGN

(71) Applicant: Saudi Arabian Oil Company, Dhahran (SA)

(72) Inventors: Ahmad D. Hammad, Dhahran (SA); Stamatios Souentie, Dhahran (SA); Issam T. Amr, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 145 days.

(21) Appl. No.: 15/447,536

(22) Filed: Mar. 2, 2017

(65) Prior Publication Data

US 2018/0254495 A1    Sep. 6, 2018

(51) Int. Cl.

| | |
|---|---|
| *H01M 8/0258* | (2016.01) |
| *H01M 8/1004* | (2016.01) |
| *H01M 8/18* | (2006.01) |
| *H01M 8/04082* | (2016.01) |
| *H01M 4/78* | (2006.01) |
| *H01M 4/86* | (2006.01) |
| *H01M 4/02* | (2006.01) |

(52) U.S. Cl.
CPC .......... *H01M 8/0258* (2013.01); *H01M 4/78* (2013.01); *H01M 4/8626* (2013.01); *H01M 8/04201* (2013.01); *H01M 8/1004* (2013.01); *H01M 8/188* (2013.01); *H01M 2004/024* (2013.01); *H01M 2004/025* (2013.01)

(58) Field of Classification Search
CPC .......................... H01M 8/0258; H01M 8/2483
See application file for complete search history.

(56) References Cited

U.S. PATENT DOCUMENTS

| | | |
|---|---|---|
| 5,509,942 A | 4/1996 | Dodge |
| 6,010,317 A | 1/2000 | Maget et al. |
| 6,245,461 B1 | 6/2001 | Smith et al. |
| 6,314,638 B1 | 11/2001 | Kaido et al. |
| 6,806,001 B1 | 10/2004 | Benczur-Uermoessy et al. |

(Continued)

FOREIGN PATENT DOCUMENTS

| | | |
|---|---|---|
| CN | 102225796 A | 10/2011 |
| CN | 104418409 A | 3/2015 |
| CN | 105463502 A | 4/2016 |

OTHER PUBLICATIONS

International Search Report pertaining to Application No. PCT/US2018/016407 dated Apr. 23, 2018.

*Primary Examiner* — Olatunji A Godo
(74) *Attorney, Agent, or Firm* — Dinsmore & Shohl, LLP

(57) ABSTRACT

An electrochemical cell, electrochemical cell assembly and a method of assembling an electrochemical cell assembly. The cell includes a pair of current collectors that when joined together form a three-dimensional electrode assembly with an ion-exchange membrane disposed between the anode and cathode of the electrode assembly. The current collectors are sized and shaped such that a three-dimensional reactant chamber volume of one of the current collectors accepts nested placement of at least a portion of the three-dimensional reactant chamber volume of the other current collector. This design allows for easy and direct addition, removal or replacement of cells in a stack of such cells in a modular fashion. In addition, ease of mounting and unmounting of the cells on reactant manifolds promotes ease of assembly of two-dimensional or three-dimensional stack structures.

26 Claims, 6 Drawing Sheets

(56) References Cited

U.S. PATENT DOCUMENTS

| | | |
|---|---|---|
| 6,838,203 B2 | 1/2005 | Zheng |
| 7,687,180 B2 | 3/2010 | Haycock et al. |
| 8,603,702 B2 | 12/2013 | Kim et al. |
| 8,962,210 B2 | 2/2015 | Ma et al. |
| 2007/0009780 A1 | 1/2007 | Smith |
| 2007/0148542 A1 | 6/2007 | Szymborski et al. |

MODULAR ELECTROCHEMICAL CELL AND STACK DESIGN

BACKGROUND

The present disclosure relates generally to an electrochemical cell and more particularly to an electrochemical cell constructed to improved serviceability and scalability attributes.

Electrochemical cells such as fuel cells convert a fuel into usable energy via electrochemical reactions rather than by combustion. As such—and in addition to having fewer failure-prone mechanical parts—electrochemical cells have several environmental advantages over internal combustions engines (ICEs) and related power-generating sources. In one common form, when configured as a fuel cell—such as a proton exchange membrane or polymer ion-exchange membrane (in either event, PEM) fuel cell—defines a generally thin two dimensional structure that includes a pair of generally planar catalyzed electrodes that are separated by a generally planar ion-transmissive medium (such as those made with a perfluorosulfonic acid, a commercial version of which is Nafion™) in what is commonly referred to as a membrane electrode assembly (MEA). Generally planar plates with serpentine reactant flow channels formed on one or both opposing major surfaces are disposed against the electrodes; in this way, the electrochemical reaction occurs when a first reactant in the form of a gaseous reducing agent (such as hydrogen, $H_2$) is introduced through the channels to be ionized at the anode and then made to pass through the porous electrodes and ion-transmissive medium such that it combines with a second reactant in the form of a gaseous oxidizing agent (such as oxygen, $O_2$) that has been introduced through the channel of another plate that is placed facingly adjacent the other electrode (the cathode); this combination of reactants form water as a byproduct. The electrons that were liberated in the ionization of the hydrogen proceed in the form of direct current (DC) to the cathode via external circuit that typically includes a load (such as an electric motor) where useful work may be performed. The power generation produced by this flow of DC electricity is typically increased by combining numerous such cells into a larger current-producing assembly. In one such construction, the fuel cells are connected in series along a common stacking dimension in the assembly—much like a deck of cards—to form a fuel cell stack. Depending on the power output required, such stacks may include a large number (often between about two hundred and three hundred) of individual stacked cells.

Similarly, in flow batteries, stored chemical energy is converted to power during battery discharging, while chemical species are electrochemically produced and stored during charging. Tanks are used to store the electrolyte solutions, namely, the anolyte and the catholyte that are pumped in order to circulate between the tanks and the electrochemical cell. During discharging of the battery, the anolyte is pumped between its tank and the electrochemical cell anode where it undergoes electrochemical oxidation, while the catholyte is pumped between its tank and the cathode where it undergoes electrochemical reduction. The two electrodes of the cell are separated by an ion exchange membrane that allows the selective diffusion of specific ionic species, like protons or hydroxyl ions. As in the case of the fuel cell, the stack in the flow battery includes multiple elemental units (that is to say, the electrochemical cells) electrically connected in series (for example, through bipolar plates) and hydraulically connected in parallel to form a stack of cells.

Such a stack of fuel cells or flow batteries is ordinarily assembled under compression in order to seal the cells or batteries and to secure and maintain a low interfacial electrical contact resistance between the reactant plates, the gas diffusion media, and the catalyst electrodes. A desired compression load on the fuel cell stack typically ranges from about fifty to about two hundred psi (and sometimes more), and is maintained by a compression retention enclosure housing the fuel cell stack. In one common form, the enclosure includes tie rods that extend through or around the end plates in order to maintain the cells in the compressed state.

A problem with this approach is that the power output of the as-assembled stack is fixed by the number of cells within the stack and the relatively precise, ordered way these cells are compressed and retained. Thus, a use-versus-supply mismatch arises if there is a need for an incremental increase in power that is greater than a single stack can provide, yet far less than that provided by the inclusion of an additional stack; such a situation leads to an inefficient use of the available power. Moreover, should one of the cells within the stack require repair or replacement, disassembly becomes a cumbersome process, as the various structural connections that span the substantial entirety of the stack must be carefully removed in order to ensure that the relatively thin-profiled cells aren't damaged during such disassembly and individual cell removal. Such serviceability concerns are especially prevalent with the thin bipolar plate structures that are used to convey the reactant to the respective electrode assemblies within the cell.

Additional sealing may be achieved through the use of numerous gaskets or related seals, often including at least one seal for each exposed surface of the reactant plates, as well as at other locations in and around the MEA. This too presents problems in that the large number of seals makes cell assembly more difficult and expensive. Furthermore, the use of the compression loads placed on the assembled stack has a tendency to cause these seals or gaskets to become either misaligned or overly compressed, either of which can compromise seal integrity.

SUMMARY

According to one embodiment of the present disclosure, an electrochemical cell is disclosed. The cell includes a pair of current collectors that when joined together form an electrode assembly, and an ion-exchange membrane disposed between the electrodes of the assembly. In addition, reactant flowpaths are included to convey a respective reactant to the electrode assembly and ion-exchange membrane. The construction of the inner (i.e., first) of the current collectors is such that the electrode structure has a three-dimensional volumetric form that can nest within a compatibly-sized and shaped volume formed within the outer (i.e., second) current collector by inserting the volume defined by the first current collector though an opening that is formed in the second current collector. In this way, once the two current collectors are joined in the nesting fashion, the respective three-dimensional volumes form an electrode assembly with the ion-exchange membrane being disposed between them. Facingly adjacent mounting surfaces of the joined collectors promote a sealed contact around the perimeter of the opening. The ion-exchange membrane is constructed such that when one of the reactants is ionized at the electrode associated with one of the current collectors, it flows through the membrane prior to being electrochemically joined to the other reactant that is ionized at the electrode of the other current collector.

Within the present context, while much of the present disclosure may be construed as describing the inner current collector as functioning as an anode to receive a reactant to be oxidized (for example, hydrogen, $H_2$) and the outer current collector as functioning as a cathode to receive a reactant to be reduced (for example, oxygen, $O_2$), it will be appreciated that an oppositely-configured electrochemical cell where the reactant being oxidized is conveyed to the outer current collector while the reactant being reduced is conveyed to the inner current collector is also contemplated. Likewise, whether the reactants being delivered to the electrochemical cell correspond to the fuel and oxygen supply or conversely the oxygen and fuel supply (for a fuel cell), or for a first electrolyte and a second electrolyte (in the case of a flow battery) is a matter of the electrode configurations, and that which reactant or electrolyte correlates to which electrode and corresponding current collector will be understood from the context. As such, both variants are deemed to be within the scope of the present disclosure.

Further within the present context, the three-dimensional volume attributes of the inner and outer current collectors is meant to distinguish from those cell configurations where one of the cell dimensions is substantially less than that of the other two in a conventional Cartesian coordinate system. For example, when the through-the-thickness dimension of a cell with otherwise planar attributes is more than an order of magnitude thinner than the length or width dimension (such as that associated with a conventional PEM fuel cell), it is deemed to define a substantially two dimensional structure, while that of the inner and outer current collectors of the disclosed cells define a substantially three-dimensional structure.

According to another embodiment of the present disclosure, an electrochemical cell assembly made up of reactant delivery conduit and a plurality of electrochemical cells. The reactant delivery conduit includes a first portion and a second portion each of which are configured to convey a different reactant than the other, while the flowpaths of the electrochemical cells are fluidly coupled to the delivery conduit to convey respective reactants to and from the electrodes in the manner set forth in the previous embodiment.

According to yet another embodiment of the present disclosure, a method of assembling an electrochemical cell assembly is disclosed. The method includes providing numerous electrochemical cells each of which includes an inner current collector, an outer current collector and an ion-exchange membrane. Each of the current collectors includes one more electrodes that are dimensionally configured to create a respective three-dimensional volume. In this way, the electrode that corresponds to the inner current collector may be made to pass through an opening formed in the outer current collector so that upon placement of the ion-exchange membrane between the electrodes of the inner and outer current collectors, at least a portion of the interior three-dimensional volume of the inner current collector is nested within the three-dimensional volume of the outer current collector. In addition, by securing the inner and outer current collectors of each electrochemical cell within the assembly to one another, opposing mounting faces from each current collector form a releasable seal around a perimeter of the opening. Furthermore, fluid coupling is established between the inner current collector of each electrochemical cell within the assembly to a first portion of a reactant delivery conduit through an inner reactant flowpath that comprises an inner reactant inlet and an inner reactant outlet that is in turn in fluid communication with the inner reactant chamber. Likewise, fluid coupling is established between the outer current collector of each electrochemical cell within the assembly to a second portion of a reactant delivery conduit through an outer reactant flowpath that comprises an outer reactant inlet and an outer reactant outlet that is in fluid communication with an interstitial space that is formed around the outer electrode.

In a comparable manner, such an assembled electrochemical cell may be operated by introducing at least a portion of one of the first and second reactants into the inner current collector from the first portion of the reactant delivery conduit and the first flowpath, while introducing at least a portion of the other of the first and second reactants into the outer current collector from the second portion of the reactant delivery conduit and the second flowpath. Subsequently, the reactants are ionized at the electrodes such that at least some of the ionized portion of the one of the introduced first or second reactants passes through the ion-exchange membrane in order to be later electrochemically combined with an ionized portion of the other of the introduced first or second reactants. An electric current generated by the ionizing of the introduced first or second reactant can be then used to perform useful work.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Embodiments disclosed herein include a source of electrical power that uses a repeating array of generally three-dimensional electrochemical cells in such a way that ease of power output scalability and individual cell maintenance is improved. Such a cell includes a pair of electrodes contained within respective housing such that the cell defines a three-dimensional structure. In this way, the flowpath that is used to introduce the reactants into the cell for subsequent ionization and electrochemical combination is not limited to a single planar surface, but may instead define a three-dimensional volumetric region. For example, if the electrodes are part of a cubic, box-like structure, there are five such generally planar surfaces per cell all of which are in fluid communication with the reactant supply. In one form, an assembly made from numerous such cells could be used for ground-based (that is to say, stationary) power units for electric power generation, combined heat and power (CHP) or the like.

Figure 1:
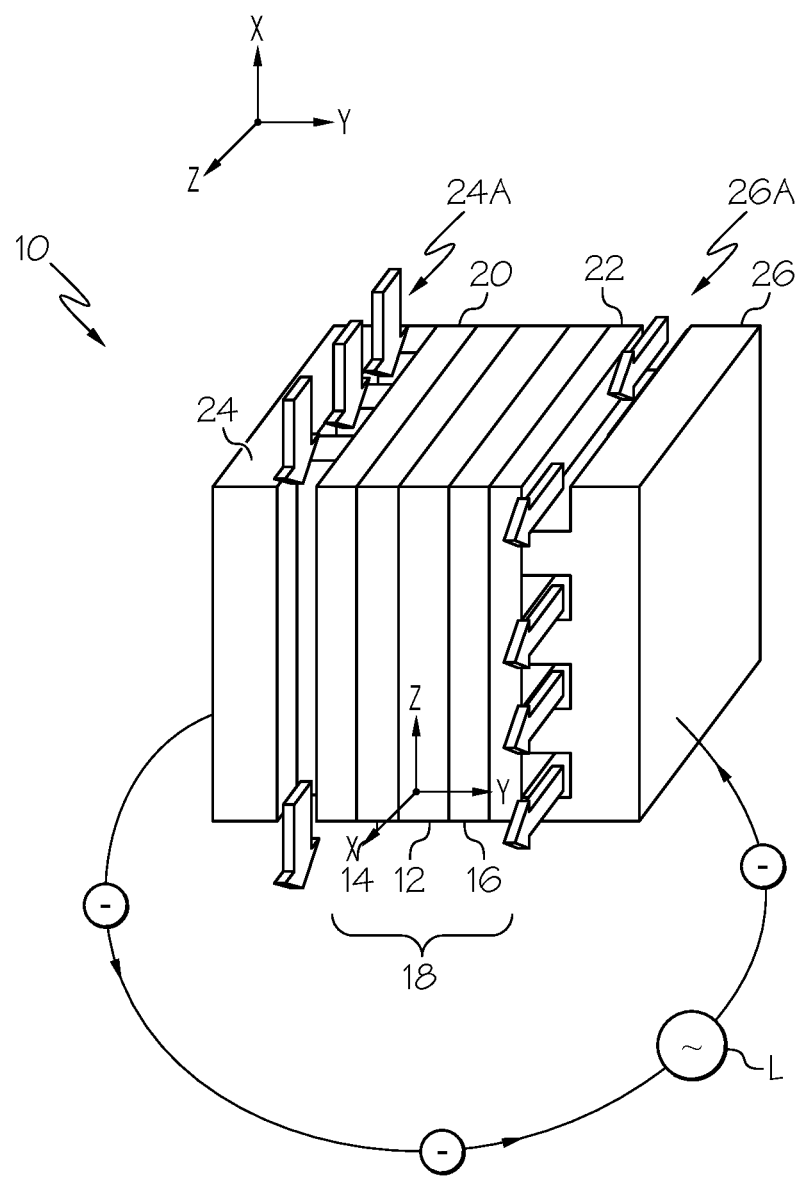
FIG. 1 illustrates a simplified partially exploded, sectional view of a portion of a planar fuel cell with surrounding bipolar plates according to the prior art.

Referring first to FIG. 1, a single fuel cell 10 of a conventional fuel cell stack is shown in schematic cross-sectional view. The fuel cell 10 includes a substantially planar PEM 12, anode catalyst layer 14 in facing contact with one surface of the PEM 12, and cathode catalyst layer 16 in facing contact with the other surface. Collectively, the PEM 12 and catalyst layers 14 and 16 are referred to as the MEA 18. An anode diffusion layer 20 is arranged in facing contact with the anode catalyst layer 14, while a cathode diffusion layer 22 is arranged in facing contact with the cathode catalyst layer 16. Each of diffusion layers 20 and 22 are made with a generally porous construction to facilitate the passage of gaseous reactants to the catalyst layers 14 and 16. Collectively, anode catalyst layer 14 and cathode catalyst layer 16 are referred to as electrodes, and can be formed as separate distinct layers as shown, or in the alternate (as mentioned above), as embedded at least partially in diffusion layers 20 or 22 respectively, as well as embedded partially in opposite faces of the PEM 12; it will be appreciated that all such variants are within the scope of the present disclosure.

In addition to providing a substantially porous flowpath for reactant gases to reach the appropriate side of the polymer ion-exchange membrane 12, the diffusion layers 20 and 22 may be used to establish electrical contact between the electrode catalyst layers 14, 16 and respective electrically conductive plates 24, 26 that in turn may be used to permit an electric current flow to an outside circuit. Moreover, by its generally porous nature, the diffusion layers 20 and 22 also form a conduit for removal of product gases generated at the catalyst layers 14, 16. Furthermore, the cathode diffusion layer 22 generates significant quantities of water vapor due to the electrochemical combination (or joining) of the ionized hydrogen and the ionized oxygen that takes place either in or on its surface; it will be appreciated that within the present context, such surface may also include the facingly-adjacent cathode catalyst layer 16. Such moisture-generating feature may be useful in keeping the PEM 12 suitably hydrated, while water management apparatus—such as hydrophobic coatings, conduit, valves, pumps or the like (none of which are shown)—may also be used to ensure that water levels in and around the cell 10 aren't excessive.

Although shown notionally as having a thick-walled structure for ease of visualization, FIG. 1 should not be used to infer that the relatively planar conventional fuel cell 10 has a significant three-dimensional structure, such as when the through-the-thickness dimension along the Y-axis of the Cartesian coordinates of the cell 10 is on the same order of magnitude as that of the length or width dimensions of the respective X or Z axes. In fact, while the in-plane dimensions tend to be relatively large (for example, measuring several inches along both the width and height dimensions for a total cell surface area of about one hundred square inches), the through-the-thickness dimension tends to be relatively small (for example, no more than about one one-hundredth of an inch). To the extent that there is a major surface-to-major surface thickness, it is significantly the result of reactant channels 24A, 26B and the corresponding plate structure 24, 26 that gives definition to such channels, where such thickness is significantly less than an order of magnitude of the length and width dimensions. Within the present context, such thin, planar cells 10 are deemed to have a two-dimensional structure. In one form, the plates 24, 26 are stamped or otherwise formed from metal sheet or foil into bipolar plates where the channels 24A, 26A are defined on the opposing major surfaces of each plate. Regardless of whether the plates 24, 26 are configured with bipolar attributes, they provide separation between facingly-adjacent MEAs 18 and accompanying diffusion layers 20, 22 from adjacent MEAs and layers (neither of which are shown) in a stack. One plate 24 engages the anode diffusion layer 20 while a second plate 26 engages the cathode diffusion layer 22. The channels 24A, 26A separate adjacent sections of the reactant gas flow channels (shown by the arrows) by projecting toward and making direct contact with the respective diffusion layers 20, 22. Moreover, while the plates 24, 26 are presently shown (for stylized purposes) defining purely rectangular reactant gas flow channels 24A, 26A and related structure, it will be appreciated by those skilled in the art that a more accurate embodiment will be those that define generally serpentine-shaped channels as is known in the art.

In operation, a first gaseous reactant, such as hydrogen ($H_2$), is delivered to the anode catalyst layer 14 side of the MEA 18 through the channel 24A from plate 24, while a second gaseous reactant, such as oxygen ($O_2$, typically in the form of air) is delivered to the cathode catalyst layer 16 side of the MEA 18 through the channels 26A from plate 26. Catalytic reactions occur at the anode catalyst layer 14 and the cathode catalyst layer 16 respectively, producing protons that migrate through the proton-conductive PEM 12 and electrons that result in an electric current that may be transmitted through the diffusion layers 20 and 22 and bipolar plates 24, 26 by virtue of contact between the lands between the channels 24A, 26A and the respective layers 20 and 22. At the cathode catalyst layer 16, the electrons and positively charged hydrogen ions combine with oxygen to form water, which flows out of the cell 10. These reactions are represented formulaically as follows:

$$2H_2 \rightarrow 4H^+ + 4e^- \tag{1}$$

$$O_2 + 4H^+ + 4e^- \rightarrow 2H_2O \tag{2}$$

where a theoretical voltage of about 1.2 volts per cell is reduced in a PEM fuel cell to about 0.7 volts in actual (i.e., "real-world") situations, where losses (such as activation losses, ohmic losses, fuel crossover losses and so-called Nerstian losses) account for the drop.

Figure 2A:
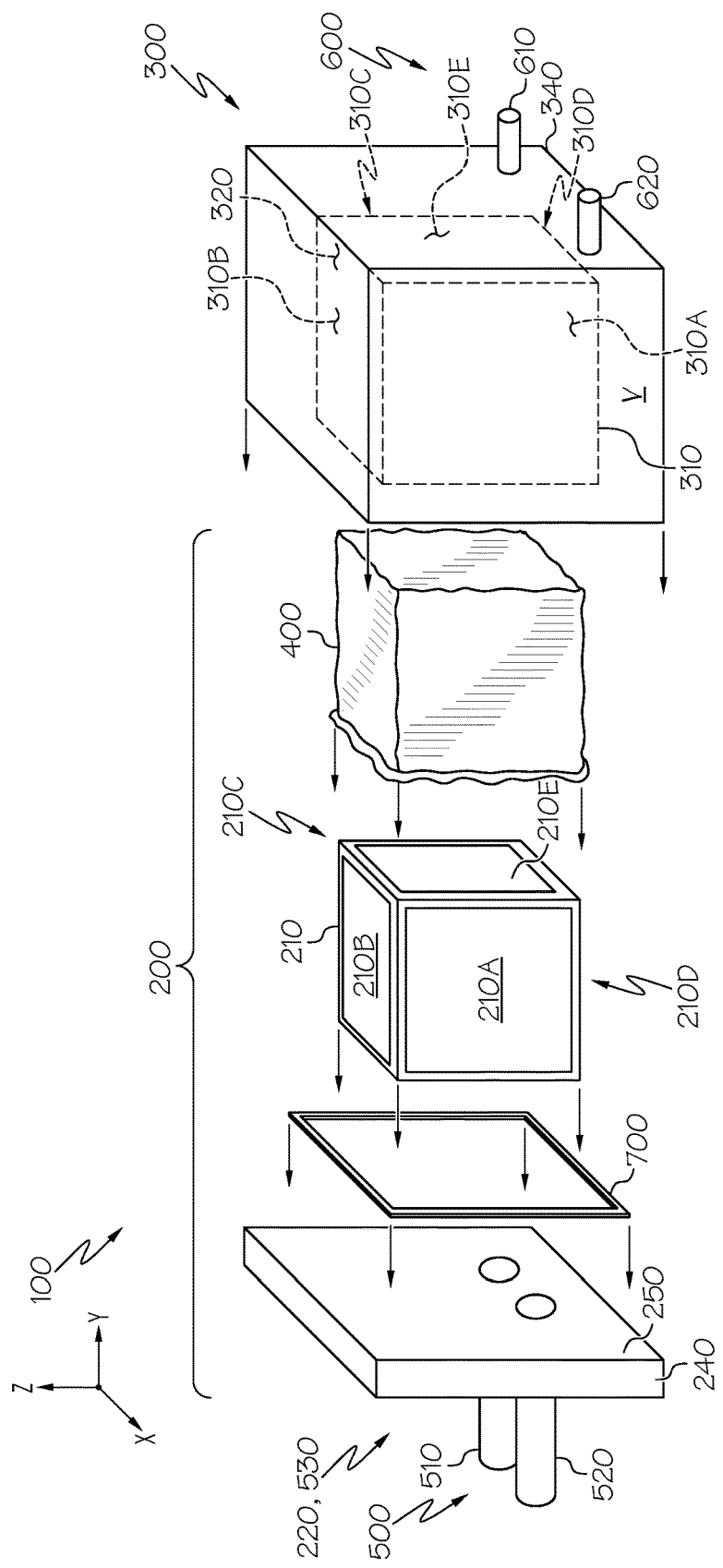
FIG. 2A illustrates a simplified exploded isometric view of an electrochemical cell configured as a fuel cell in accordance with one or more embodiments shown or described herein.
Figure 2B:
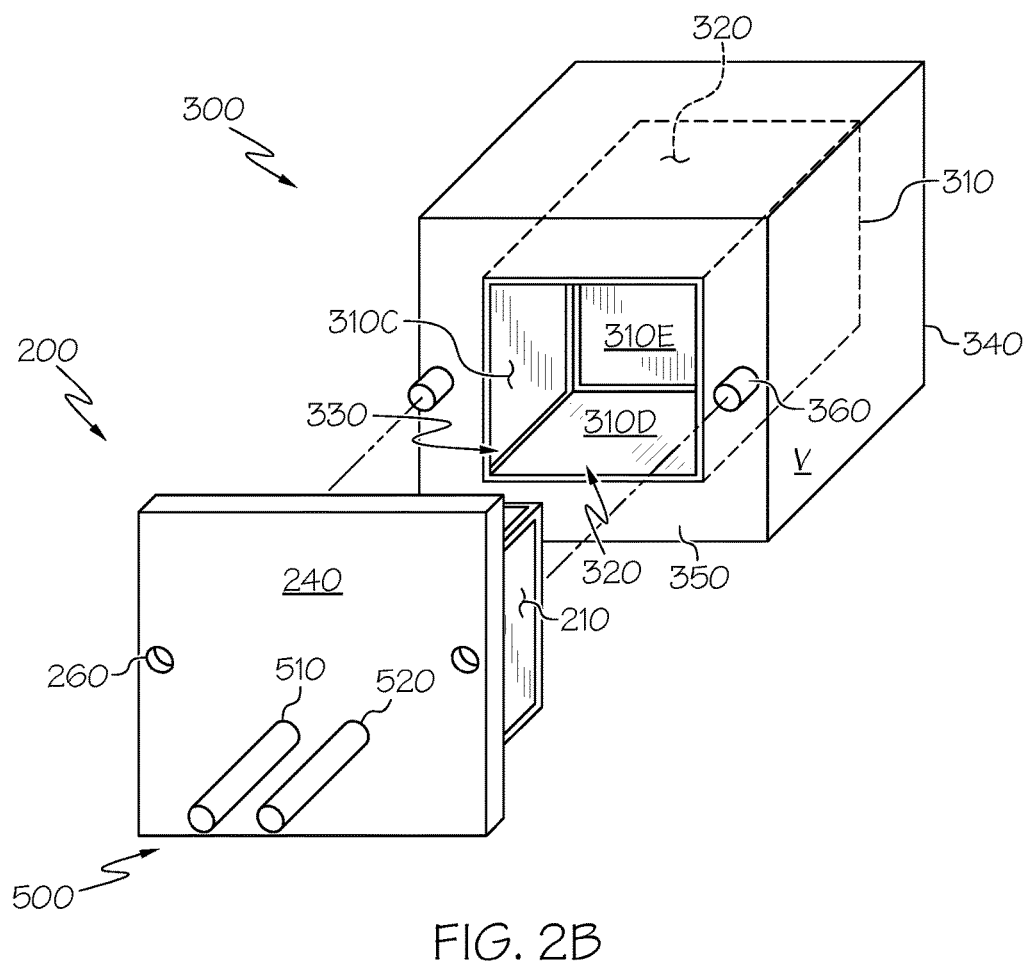
FIG. 2B illustrates a different simplified exploded isometric view of the fuel cell of FIG. 2A.

Referring next to FIGS. 2A and 2B, instead of using a stack of generally planar fuel cells 10, the electrochemical cell 100 according to the present disclosure employs simple unit cells in a two-part nested construction. Although shown as having a cubic structure, cell 100 may also define other shapes (such as hemispherical, triangular or the like) depending on how many surfaces are formed by the electrodes, so long as such surface or surfaces provide a three-dimensional volumetric reactant chamber. Thus, in one embodiment of an electrochemical cell 100 according to the present disclosure, each half-cell is made up of a inner current collector 200 and a outer current collector 300 with primary structures in the form of a frame 240 and housing 340, respectively. Unlike conventional fuel cell configurations—where numerous thin individual planar cells each with an anode, cathode and intermediate electrolyte are arranged in a stack or related construction to achieve higher power outputs—a complete electrochemical cell 100 within the context of the present disclosure is formed from the combination of the inner current collector 200 with an electrode 210 that extends a significant direction along all three Cartesian coordinate axes to define a three-dimensional structure. Such electrode 210 is made up of major surfaces 210A, 210B, 210C, 210D and 210E. A sixth surface associated with the frame 240 cooperates with these major surfaces 210A, 210B, 210C, 210D and 210E to define an interior three-dimensional volume 220 that corresponds to an inner reactant chamber 530 that acts as an enclosure for the introduction of one of the reactants. The sixth surface functions to provide a wall through which reactant-bearing inlet and outlet flowpaths 510, 520 pass, as well as for power connectivity and other ancillary infrastructure. Likewise, a comparable electrode 310 is formed by the major surfaces 310A, 310B, 310C, 310D and 310E of the outer current collector 300 that also extend a significant direction along all three Cartesian coordinate axes. The volume 310 defined by the electrode 310 is situated within the surrounding housing 340 in such a way that an at least partially hollow interstitial volume (not shown) is formed between the generally cubic electrode 310 and the inner surface of the housing 340. As shown, both electrodes 210, 310 define a generally cubic structure where all of the various electrode surfaces associated with each respective current collector 200, 300 are constructed of generally contiguous members of substantially equal length and width dimensions of right-angle construction relative to one another. As discussed above, it will be appreciated by those skilled in the art that other three-dimensional shapes may also be employed so long as they promote a three-dimensional construction of cell 100, as well as the relatively unobstructed insertion and removal between the first and outer current collectors 200, 300. Significantly, the interior three-dimensional volume 220 defined by electrode 210 within the inner current collector 200 is sized and shaped to be insertable through an opening 330 and into the volume defined by electrode 310 within the outer current collector 300.

The surfaces that make up the electrode 210 form a substantially continuous three-dimensional fluid boundary for the receipt of one of the reactants; in this way, when sealingly secured on a mounting surface 250 that is defined on frame 205, the electrode 210 and its respective surfaces 210A, 210B, 210C, 210D and 210E form a fluid-tight container so that the only substantial ingress and egress for the non-ionized reactant contained therein is through flowpath 500 and its respective inlet 510 and outlet 520. In a similar manner, the contiguous edgewise connection of the various surfaces 310A, 310B, 310C, 310D and 310E of electrode 310 ensures that they form a substantially continuous three-dimensional fluid boundary for the receipt of the other of the reactants; in this way, when sealingly secured within housing 340, these surfaces 310A, 310B, 310C, 310D and 310E form a fluid-tight container so that the only substantial ingress and egress path for the non-ionized reactant contained therein is through flowpath 600 and its respective inlet 610 and outlet 620.

In one form, the contiguous electrode surfaces 210A, 210B, 210C, 210D and 210E or 310A, 310B, 310C, 310D and 310E of the respective inner and outer current collectors 200, 300 attain their electrode status through having an electrocatalyst (such as platinum or the like) be disposed on a fluidly porous and electrically conductive media that is exposed to the as-introduced reactant. For example, if the catalyst is dispersed directly onto the ion-exchange membrane 400 and the ion-exchange membrane 400 is in the form of a PEM, then the combination may be referred to as a catalyst coated membrane (CCM). Any suitable porous media—such as carbon in either woven or finely divided powder form—known in the art may be used as support for the electocatalyst.

An ion-exchange membrane 400 is disposed between the electrodes 210, 310. The ion-exchange membrane 400 is constructed such that when a first reactant is ionized at the numerous contiguous electrode surfaces 210A, 210B, 210C, 210D and 210E or 310A, 310B, 310C, 310D and 310E (depending on which of the current collectors 200, 300 is configured to receive the reactant being oxidized), it flows through the ion-exchange membrane 400 prior to being electrochemically joined to a second reactant that is ionized at the plurality of contiguous electrode surfaces 310A, 310B, 310C, 310D and 310E or 210A, 210B, 210C, 210D and 210E of the other of current collectors 300, 200.

In one form, the frame 240 of the inner current collector 200 defines a generally rectangular shape with which to provide the planar mounting surface 250 for the secure attachment of the edges of electrode surfaces 210A, 210B, 210C and 210D. Similarly, the housing 340 of the outer current collector 300 forms a rigid attachment with an exposed planar mounting surface 350 at one end that can be seated on the planar mounting surface 250 of the frame 240 of the inner current collector 200. Gaskets 700 may be secured or otherwise mounted onto one or the other of the planar mounting surfaces 250, 350. In one form, only one of the gaskets 700 are formed on a corresponding one of the planar mating surfaces 250, 350, while in another form, they can be formed on each respective planar mounting surfaces 250, 350. The use of a single gasket 700 ensures that a reactant that is introduced into the inner volume 220 of the electrode 210 will not prematurely or inadvertently combine with a reactant being introduced to the electrode 310.

Significantly, the proposed gasket 700 configuration permits a single peripheral gasket, thereby significantly simplifying sealing construction relative to that of the planar fuel cell design discussed in conjunction with FIG. 1. Not only does this reduce the chances for reactant or byproduct leakage, it makes it easier (and less expensive) in cell 100 configurations where otherwise numerous gaskets within each planar fuel cell would be required. Furthermore, threaded bolts or other fastening members 360 can be made to project outwardly from the planar mating surface 350 of the outer current collector 300 in order to fit within apertures 260 formed in the inner current collector 200 as way to compress the gaskets 700 and provide tight, secure attachment between the mating planar mounting surfaces 250, 350. Similarly, in situations where acid electrolytes are used (such as for the electrolysis of water or the reverse recombination of $H_2$ and $O_2$ into water), the overall cost may be significantly reduced, as the far fewer number of required gaskets takes on greater significance in such circumstances where the gaskets must be made from an acid-resistant—and therefore much more expensive—material. One example of an assembly as discussed herein that could use an acidic electrolyte is one where the individual cells 100 are configured as phosphoric acid fuel cells (PAFCs). Although the electrolyte is different, the reliance on both on $H_2$ and $O_2$ means that their electrode reactions as depicted in Equations (1) and (2) are identical. Likewise, the construction of the electrodes and catalysts tend to be very similar between PEM and PAFC constructions. In situations where the assembly discussed herein is made from PAFC (rather than PEM) cells 100, the electrolyte may be distributed in a porous layer (for example, one made from silicon carbide or the like). As with PEM-based configurations, the use of water management conduit may be beneficially employed.

Figure 3:
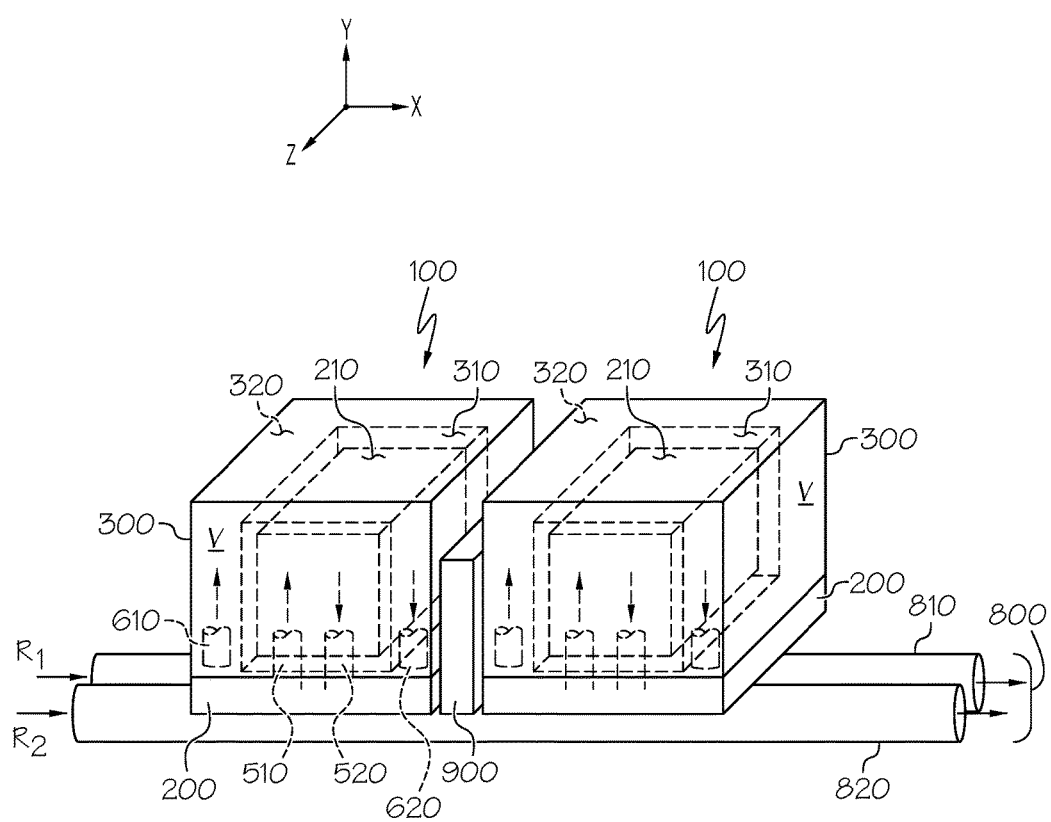
FIG. 3 illustrates a pair of the fuel cells of FIGS. 2A and 2B in their fluid connection to reactant-conveying conduit in accordance with one or more embodiments shown or described herein.

Flowpath 500 is formed to provide fluid access to the inner current collector 200. One of a first and second reactant is introduced through an inlet flowpath 510 into the inner reactant chamber 530 of the inner current collector 200, while excess is taken out through an outlet flowpath 520. A comparable flowpath 600 with inlet flowpath 610 and outlet flowpath 620 is used to convey the other of a first and second reactant through the interstitial volume V that resides between the housing 340 and the electrode 310 of the outer current collector 300. Quick-connect fluid couplings (not shown) may be formed on the outward-directing ends of flowpaths 500, 600 to promote ease of connecting and disconnecting of each cell 100 from reactant delivery conduit 800 that will be discussed in more detail below. Such couplings or related fluid fittings may be operated by hand to give tool-free connecting and disconnecting without the need for a wrench or related instrument. In addition, such couplings may be equipped with self-sealing valves as a way to minimize spillage for residual reactant. It will be appreciated that the placement of the flowpaths 500, 600 on the respective inner and outer current collectors 200, 300 depicted in FIGS. 2A, 2B and 3 is merely shown for visualization convenience, and that their preferred placement is that location on the cell 100 that promotes ease of manufacture, assembly or disassembly in the manner consistent with the present disclosure.

With particular regard to the three-dimensional geometric features, the protruding hollow cube that makes up the inner current collector 200 projects along the insertion (or nesting) direction along the Cartesian Y-axis with lateral projections along the corresponding X-axis and Z-axis. This hollow cube forms one of the electrodes 210 with five generally planar exposed surfaces 210A, 210B, 210C, 210D and 210E, while the receiving hollow cube that makes up the outer current collector 300 forms the other electrode 310, also with five generally planar exposed surfaces 310A, 310B, 310C, 310D and 310E. In this way, each cell 100 forms the electrical conversion capability of five similarly-sized traditional planar fuel cells 10 of FIG. 1. By having simple geometric shapes, coupled with quick-connect fluid coupling and compressed, secure connection between the first and outer current collectors 200, 300, autonomy of each cell 100 is promoted. This is furthered by having the assembly and fluid connection of each cell 100 not depend on the assembly and fluid coupling of any adjacent cells 100 in order to have each cell 100 perform its current-generating function Likewise, the ease with which each cell 100 may be disassembled, removed, repaired, reassembled and reconnected to the reactant delivery conduit 800 (that is shown in FIG. 3 and discussed below) provides an enhanced degree of serviceability that is not available in the compressed stack cells 10 of FIG. 1, while the multi-surfaced electrode configuration of each cell 100 allows for incremental increases in electric current and related power output without having to attach an entirely separate stack. Moreover, the fluid communication between the flowpaths 500, 600 and the respective volumes 220, 320 within the corresponding current collectors 200, 300 is configured such that each of the plurality of contiguous electrode surfaces 210A, 210B, 210C, 210D and 210E or 310A, 310B, 310C, 310D and 310E receives the respective first or second reactant substantially equally and substantially simultaneously with all other surfaces, thereby promoting minimum pressure drop of the reactant as it flows from the reactant delivery conduit 800 discussed below and toward the ion-exchange membrane 400.

As mentioned above, while FIGS. 2A and 2B disclose an electrochemical cell 100 where the inner current collector 200 acts as an anode such as to receive $H_2$ or a related reactant being oxidized and the outer current collector 300 acts as a cathode such as to receive $O_2$ or a related reactant being reduced, it will be appreciated that the choice of anode versus cathode for the current collectors 200, 300 is arbitrary, and that with suitable modifications to the construction of and introduction of reactant into the electrodes formed within each such current collectors 200, 300, an oppositely-configured cell 100 where the outer current collector 300 acts as an anode such as to receive the reactant being oxidized and the inner current collector 200 acts as a cathode such as to receive the reactant being reduced is also within the scope of the present disclosure.

Referring with particularity to FIG. 2B, where the ion-exchange membrane 400 and gasket 700 of FIG. 2A have been omitted for clarity, a first reactant flowpath 500 is shown in the form of an inlet 510 and an outlet 520 extending through the wall of the frame 240 with mating surface 250 that acts as a closure surface when secured against the corresponding mating surface 350 of the housing 340 that provides structure and containment for the outer current collector 300. By having all of the flowpaths 500, 600 (and their associated quick-connect couplings) be located on one surface of the cell 100 promotes ease of scalability and maintenance by permitting direct plugging and unplugging of the cell 100 along a common pair of reactant-conveying fluid conduit, such as that shown and discussed in conjunction with FIG. 3 below.

In situations where the electrode assembly and the intervening ion-exchange membrane 400 are structured to have the present cubic or related three-dimensional attributes, the resulting MEA and surrounding current collectors 200, 300 may benefit from a balanced water level to ensure proper operation. In particular, a water management conduit (not shown) may be fluidly connected to each cell 100 to ensure that an adequate level of hydration is present to promote the conductivity of the ion-transmissive ion-exchange membrane 400 that is disposed between catalyzed electrodes. This is particularly useful when the ion-exchange membrane 400 is a PEM, as selective locations within such a cell require excess water removal to avoid flooding or related blockage of the reactant flowpaths 500, 600. It will be understood that when used to remove excess water in configurations where the ion-exchange membrane 400 is configured to have a proton migration path therethrough, such a water management conduit is preferably connected to the fluid side of the MEA where the $O_2$ is being introduced. In other locations within the cell 100, it would be beneficial to provide additional hydration. In one form, the water management conduit is preferably placed fluidly adjacent the location where the combining of the two ionized reactants takes place, and that all such variants are deemed to be within the scope of the present disclosure. Such water management conduit may be used in conjunction with one or more water vapor transfer (WVT) units or devices (also referred to as a cathode humidifier unit, membrane humidifier, fuel cell humidifier or the like). In such a WVT unit configuration, wet-side and dry-side reactant flowpaths (for example, a cathode exhaust and a cathode inlet) may be placed in moisture-exchange communication with one another through a membrane media in the WVT unit such that excess moisture leaving the cathode exhaust may diffuse through the media to the drier flowpath on the cathode inlet.

Referring next to FIGS. 3 along with 4A and 4B, an assembly made up of numerous cells 100 (two of which are presently shown) that are aligned along the reactant delivery conduit 800 that is divided into first and second portions 810, 820. In one example, the first reactant R1 (such as $H_2$ or related fuel) may be conveyed through the first reactant delivery conduit portion 810 so that it can be introduced into the three-dimensional inner surface profile of the inner current collector 200 via inlet flowpath 510 while the excess can be removed from the same through the outlet flowpath 520. Likewise, the second reactant R2 (such as air or a related $O_2$ supply) may be conveyed through the second reactant delivery conduit portion 820 so that it can be introduced into the interstitial space between the three-dimensional electrode and the housing 340 of the outer current collector 300 via inlet flowpath 610 while the excess can be removed from the same through the outlet flowpath 620. Although shown presently with the division between the first and outer current collectors 200, 300 as taking place along the vertical (i.e., Y-axis) direction, it will be appreciated that the orientation of the cells 100 and their corresponding direction of movement in order to effect connection and disconnection between the current collectors 200, 300 from one another—as well as fluidly decoupling of each cell 100 from the reactant delivery conduit 500—may be a matter of design choice to take into consideration ease of serviceability and scalability, and that all such variants are deemed to be within the scope of the present disclosure.

A cross-interconnect 900 may be placed between adjacent cells 100 in order to provide one or the other of series and parallel electrical connection between them, where series connectivity may be used to increase voltage output and parallel connectivity may be used to increase current output. In this way, the desired voltage and current output from as assembly of numerous cells 100 can be tailored to meet the needs of a load being powered. As can be seen, in one form, a small amount of spacing is reserved between adjacent cells 100; in addition to creating space for the optional cross-interconnect 900, such spacing helps to avoid disturbing an adjacent cell 100 when one is being taken apart for servicing, as well as when a new one is being added to the assembly. The relative autonomy enjoyed by each of the individual cells 100 means that the difficulties associated with traditional stack-based designs—including pre-assembly compression and alignment of cells, as well as the subsequent reverse steps required when attempting to remove or replace one or more such cells—is reduced or eliminated.

In operation, the first reactant R1 is conveyed longitudinally along the axial of the first reactant delivery conduit portion 810. For each cell 100, the first flowpath 510—which may be fluidly connected to the first reactant delivery conduit portion 810 through a quick-connect coupling (not shown)—acts like a side-branch 815 off of the first reactant delivery conduit portion 810 in order to serve as an inlet into the cell 100 in general and the generally hollow volumetric space that is defined by the three-dimensional inner volume 220 in particular. The multi-surface exposure of the reactant R1 that is introduced to the electrode 210 of the three-dimensional inner volume 220 and subsequent catalytic reaction (such as that depicted in Equation (1) above) causes the ionized reactant R1 to pass through the conductive ion-exchange membrane 400. In one form, the ion-exchange membrane 400 forms an enveloping glove-like (or bag-like) surrounding of the electrode 210 that is made up of the major surfaces 210A, 210B, 210C, 210D and 210E, while in another form, the ion-exchange membrane 400 forms a wallpaper-like covering of the electrode 310 that is made up of major surfaces 310A, 310B, 310C, 310D and 310E. From there, the ionized first reactant R1 can combine with ionized second reactant R2 that is delivered from the inlet flowpath 610 that may be fluidly connected to the second reactant delivery conduit portion 820 through a similar quick-connect coupling. In a similar manner to that of the first reactant R1, the exposure of the reactant R2 that is introduced into the electrode 310 and subsequent catalytic reaction (such as that depicted in Equation (2) above) causes the ionized second reactant R2 (which cannot pass through the conductive ion-exchange membrane 400 in the same manner as reactant R1) to combine with reactant R1 at the electrode 310 major surfaces 310A, 310B, 310C, 310D and 310E. As mentioned above, in situations where the first reactant R1 is $H_2$ and the second reactant R2 is $O_2$, the water generated by the combination of these two reactants may be managed (including removal and hydration, both as needed) by a water management conduit. Any unconsumed excess of the reactants R1, R2 may be conveyed away from the respective first and outer current collectors 200, 300 through the corresponding outlet flowpaths 520, 620 and back into the respective streams that flow within the first and second reactant delivery conduit portions 810, 820. As with the inlet flowpaths 510, 610, the outlet flowpaths 520, 620 may be equipped with quick-connect couplings.

Figure 4A:
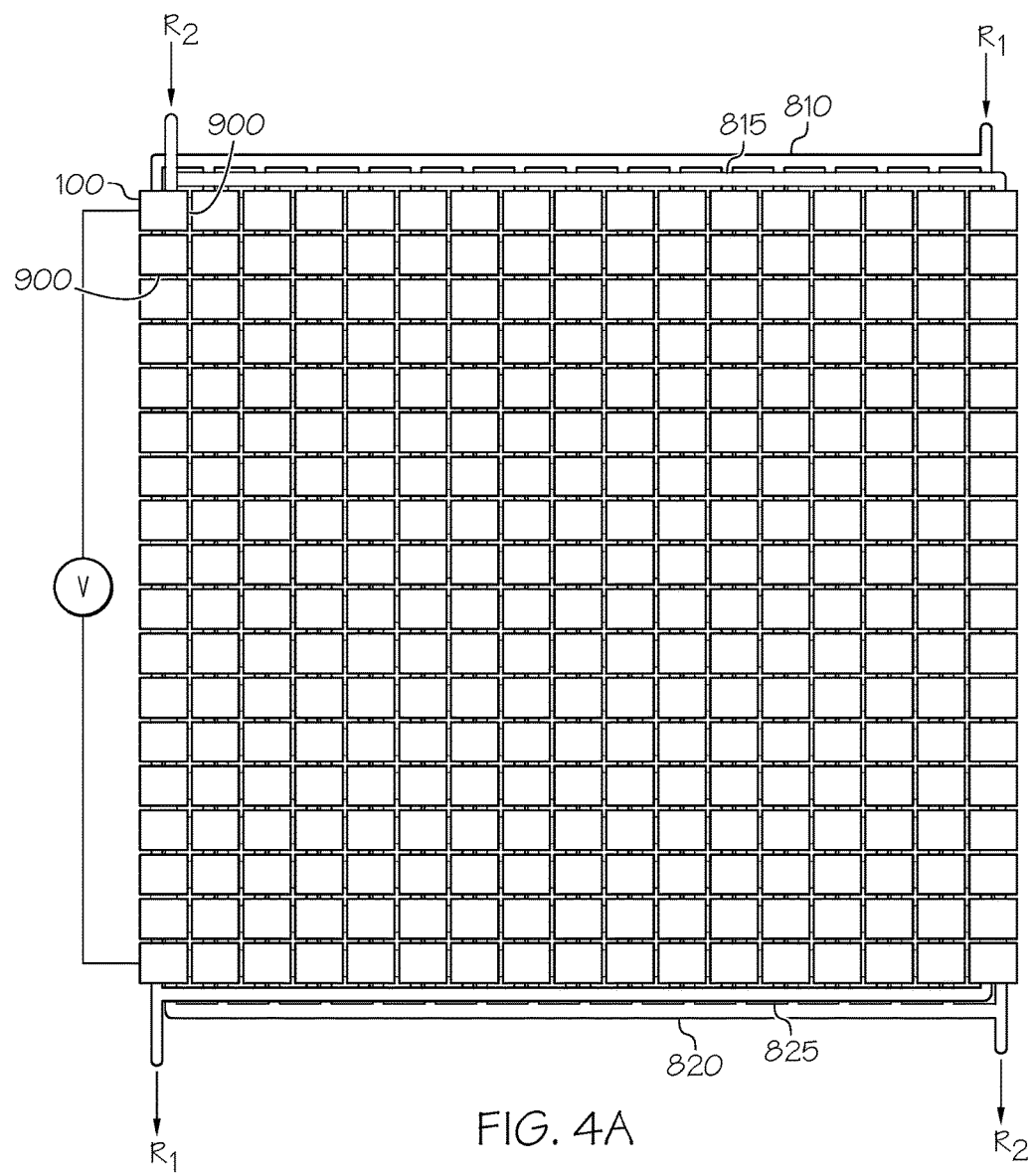
FIGS. 4A and 4B illustrate respectively plan and horizontal edge views of a notional two dimensional cell array and a linear cell array.

As shown with particularity in FIG. 4A, the individual cells 100 may be arranged in a modular two-dimensional array or matrix such that they form a larger assembly. In such construction, the two reactant delivery conduit portions 810, 820 may act as manifolds so that numerous side-branches 815, 825 may extend from the respective manifold so that the various cells 100 may be arranged in the matrix-like manner shown. Likewise, the various cross-interconnects 900 may be used to establish the desired level of series and parallel electrical coupling between some of all of the individual cells 100. Although depicted in exemplary way as having a seventeen-by-eighteen array of 350 cells that should be capable of generating a high voltage output (for example, around 300 volts) by virtue of each of the seventeen cells 100 within each row being electrically connected in a negative-to-positive series followed by the last cell 100 in each row being connected to the first cell 100 in an adjacent row, it will be appreciated that other arrays and other forms of the cross-interconnects 900 may be used as needed.

Figure 4B:
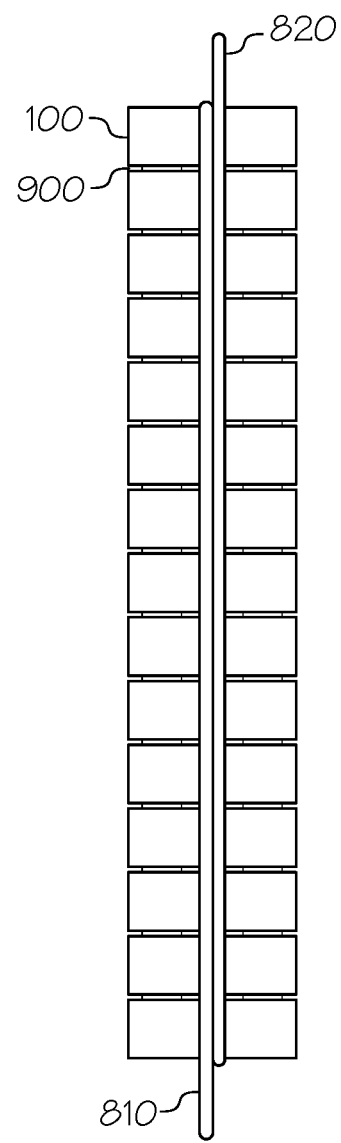

As shown with particularity in FIG. 4B, the individual cells 100 may be arranged as part of a modular linear array of individual cells 100. As shown, the various cells 100 may straddle the elongate reactant delivery conduit portions 810, 820. As with the two-dimensional array or matrix that is depicted in FIG. 4A, the two reactant delivery conduit portions 810, 820 may act as manifolds so that numerous side-branches 815, 825 (such as shown in FIG. 4A) may extend toward the various cells 100 for ease of fluid connecting and disconnecting. Also as with the two-dimensional array or matrix that is depicted in FIG. 4A, the modular construction made possible by the autonomous individual cells 100 means that the electric power output of the linear array may be made as large or small as needed, merely by adding to or removing from the reactant delivery conduit portions 810, 820 one or more of cells 100. It will also be appreciated that a combination of the embodiments of FIGS. 4A and 4B may be constructed in order to give the assembly a two-deep construction. In such case, the structure can be further expanded to three-dimensional stack.

While the present disclosure is particularly suited to fuel cells, it is also useful as a power source in a flow battery (also referred to herein as a secondary battery, not shown). Instead of generating electrical energy through the reduction-oxidation reactions associated with the MEA-based structure discussed herein for a fuel cell, the flow battery stores chemical energy in the form of electroactive materials that can be conveniently stored and subsequently used as part of a negative electrode reaction and positive electrode reaction discharging process for the creation of electric current. A pair of tanks may be used to store the electroactive materials. These active materials form the equivalent of ion-exchange membrane 400 (albeit in liquid form) from each of the tanks by corresponding pumps for delivery into one or the other of the inner and outer current collectors 200, 300. In one form, the electrolyte solutions include one or more transition metals that can be oxidized or reduced, which in turn leads to generating a corresponding electromotive force. As such, a battery made in conjunction with the present disclosure differs from traditional batteries in that the storage of the electrolytes in the external tanks. In this way, the energy being stored need not be contained within the bulk electrode materials and the attendant mechanical and thermal stresses associated with battery operation. This helps promote overall assembly modularity and its related serviceability and scalability attributes. When configured as a battery, the electrolyte contained within the tanks and pumped to the cell 100 from pumps is still deemed to be disposed between the two electrode assemblies (such as those associated with the electrodes 210, 310) once introduced into the cell 100, even if in a liquid form instead of the membrane form associated with PEM-based configurations, in that such electrolyte still is used for ion transport.

Although not shown, the present disclosure may also be configured as an electrolyzer that uses electricity and catalytically-active electrodes in order to promote an otherwise non-spontaneous chemical reaction. In one exemplary form, the electrolyzer may be used to transform water ($H_2O$) into $H_2$ and oxygen $O_2$. In one exemplary form, such an electrolyzer cell may use a PEM such that it along with the anode and cathode form the MEA discussed herein. Thus, to obtain $H_2$, the cell 100 configured as an electrolyzer could use a conventional water source (such as sea water or the like) so that the electrode is made from a material that can withstand high current density and high voltages. In one form, the water being supplied is acidic or alkaline, while in another form, the water is relatively free of salinity, acidity or alkalinity such that is relatively pure. Such an electrolyzer may also be used for electrochemical machining, rust removal, electroplating, the production of metals from metallic compounds, as well as the generation of chlorine, sodium hydroxide, electrolyzed water or the like.

It is noted that for the purposes of describing and defining features discussed in the present disclosure, it is noted that reference herein to a variable being a function of a parameter or another variable is not intended to denote that the variable is exclusively a function of the listed parameter or variable. Rather, reference herein to a variable that is a function of a listed parameter is intended to be open-ended such that the variable may be a function of a single parameter or numerous parameters. It is likewise noted that recitations herein of a component of the present disclosure being configured or programmed in a particular way, to embody a particular property, or function in a particular manner, are structural recitations, as opposed to recitations of intended use. More specifically, the references herein to the manner in which a component is programmed or configured denotes an existing physical condition of the component and, as such, is to be taken as a definite recitation of the structural characteristics of the component.

It is noted that one or more of the following claims utilize the term "wherein" as a transitional phrase. For the purposes of defining features discussed in the present disclosure, it is noted that this term is introduced in the claims as an open-ended transitional phrase that is used to introduce a recitation of a series of characteristics of the structure and should be interpreted in like manner as the more commonly used open-ended preamble term "comprising".

It is noted that terms like "preferably", "generally" and "typically" are not utilized herein to limit the scope of the claims or to imply that certain features are critical, essential, or even important to the structures or functions disclosed herein. Rather, these terms are merely intended to highlight alternative or additional features that may or may not be utilized in a particular embodiment of the disclosed subject matter. Likewise, it is noted that the terms "substantially" and "approximately" and their variants are utilized herein to represent the inherent degree of uncertainty that may be attributed to any quantitative comparison, value, measurement or other representation. As such, use of these terms represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An electrochemical cell comprising:
   an inner current collector;
   an inner reactant flowpath;
   an outer current collector;
   an outer reactant flowpath; and
   an ion-exchange membrane, wherein
   the inner reactant flowpath comprises an inner reactant inlet, an inner reactant outlet, and an inner reactant chamber in fluid communication with the inner reactant inlet and the inner reactant outlet,
   the inner current collector comprises one or more inner electrodes that are dimensionally configured to create an interior three-dimensional volume forming at least a portion of the inner reactant chamber,
   the outer current collector comprises one or more outer electrodes that are dimensionally configured to create an interior three-dimensional volume forming an opening therein,
   the inner current collector and the interior three-dimensional volume of the inner current collector are nested through the opening and within the three-dimensional volume of the outer current collector such that the interior three-dimensional volume of the inner current collector resides within both the inner current collector and the outer current collector,
   the inner electrodes of the inner current collector oppose the outer electrodes of the outer current collector across the ion-exchange membrane,
   the outer reactant flowpath is separated from the ion-exchange membrane by the outer electrodes, and
   the inner current collector and the outer current collector comprise opposing mounting faces that form a releasable seal around a perimeter of the opening.

2. The electrochemical cell of claim 1, wherein the electrode of each of the inner and outer current collectors comprises a single continuous surface.

3. The electrochemical cell of claim 1, wherein the electrode of each of the inner and outer current collectors comprises a plurality of distinct electrode surfaces.

4. The electrochemical cell of claim 3, wherein the electrode of each of the inner and outer current collectors comprises at least three distinct electrode surfaces.

5. The electrochemical cell of claim 3, wherein the electrode of each of the inner and outer current collectors comprises at least four distinct electrode surfaces.

6. The electrochemical cell of claim 3, wherein the electrode of each of the inner and outer current collectors comprises at least five distinct electrode surfaces that define a substantially cubic structure.

7. The electrochemical cell of claim 3, wherein each of the plurality of distinct electrode surfaces of the inner collector receives a reactant substantially equally and substantially simultaneously with all of the other surfaces of the plurality of distinct electrode surfaces of the inner collector, while each of the plurality of distinct electrode surfaces of the outer collector receives a reactant substantially equally and substantially simultaneously with all of the other surfaces of the plurality of distinct electrode surfaces of the outer collector.

8. The electrochemical cell of claim 1, wherein the electrodes of each of the first and outer current collectors comprise an electrocatalyst disposed on a fluidly porous and electrically conductive media.

9. The electrochemical cell of claim 1, wherein the ion-exchange membrane comprises a polymer ion-exchange membrane such that it along with the electrodes of the inner and outer current collectors forms a membrane electrode assembly.

10. The electrochemical cell of claim 9, wherein the ion-exchange membrane substantially envelops the inner reactant chamber.

11. The electrochemical cell of claim 9, wherein the ion-exchange membrane covers the substantially entirety of the interior three-dimensional volume of the outer current collector.

12. The electrochemical cell of claim 9, wherein the ion-exchange membrane extends laterally over at least a portion of at least one of the mounting faces.

13. The electrochemical cell of claim 1, wherein the electrochemical cell comprises a battery.

14. The electrochemical cell of claim 1, wherein the electrochemical cell comprises a fuel cell.

15. The electrochemical cell of claim 14, further comprising a water management conduit that is in fluid communication with a membrane electrode assembly that is formed by the ion-exchange membrane and the electrodes of the inner and outer current collectors.

16. The electrochemical cell of claim 1, further comprising a gasket disposed on at least one of the mounting faces.

17. The electrochemical cell of claim 1, wherein both of the inner reactant inlet and the inner reactant outlet are located in one surface of the inner current collector.

18. An electrochemical cell assembly comprising:
reactant delivery conduit defining a first portion and a second portion each of which are configured to convey a different reactant than the other; and
a plurality of electrochemical cells each comprising:
an inner current collector;
an inner reactant flowpath;
an outer current collector;
an outer reactant flowpath; and
an ion-exchange membrane, wherein
the inner reactant flowpath comprises an inner reactant inlet, an inner reactant outlet, and an inner reactant chamber in fluid communication with the inner reactant inlet and the inner reactant outlet,
the inner current collector comprises one or more inner electrodes that are dimensionally configured to create an interior three-dimensional volume forming at least a portion of the inner reactant chamber,
the outer current collector comprises one or more outer electrodes that are dimensionally configured to create an interior three-dimensional volume forming an opening therein,
the inner current collector and the interior three-dimensional volume of the inner current collector are nested through the opening and within the three-dimensional volume of the outer current collector such that the interior three-dimensional volume of the inner current collector resides within both the inner current collector and the outer current collector,
the inner electrodes of the inner current collector oppose the outer electrodes of the outer current collector across the ion-exchange membrane,
the outer reactant flowpath is separated from the ion-exchange membrane by the outer electrodes, and
the inner current collector and the outer current collector comprise opposing mounting faces that form a releasable seal around a perimeter of the opening.

19. The electrochemical cell assembly of claim 18, wherein each of the portions of the reactant delivery conduit comprises a manifold with a plurality of branches that extend substantially parallel with one another and substantially orthogonal to a flow of reactant contained within the manifold.

20. The electrochemical cell assembly of claim 19, wherein the plurality of electrochemical cells are coupled to the parallel-extending branches of the reactant delivery conduit in such a way that they define a substantially two-dimensional cell array.

21. The electrochemical cell assembly of claim 20, wherein the manifolds of the reactant delivery conduit are spaced apart from one another in a parallel manner on substantially opposing edges of the two-dimensional cell array.

22. The electrochemical cell assembly of claim 18, further comprising a cross-interconnect to provide one or the other of series and parallel electrical connection between adjacent electrochemical cells.

23. A method of forming an electrochemical cell assembly, the method comprising:
providing a plurality of electrochemical cells each of which comprise:
an inner current collector with one or more inner electrodes that are dimensionally configured to create an interior three-dimensional volume that forms at least a portion of an inner reactant chamber;
an outer current collector with one or more outer electrodes that are dimensionally configured to create an interior three-dimensional volume with an opening therein;
an ion-exchange membrane disposed between the electrodes of the inner and outer current collectors;
inserting, for each electrochemical cell within the assembly, the inner current collector through the opening in the outer current collector such that at least a portion of the interior three-dimensional volume of the inner current collector is nested within the three-dimensional volume of the outer current collector;
securing the inner and outer current collectors of each electrochemical cell within the assembly to one another such that opposing mounting faces from each current collector form a releasable seal around a perimeter of the opening;

fluidly coupling the inner current collector of each electrochemical cell within the assembly to a first portion of a reactant delivery conduit through an inner reactant flowpath that comprises an inner reactant inlet and an inner reactant outlet that is in fluid communication with the inner reactant chamber; and fluidly coupling the outer current collector of each electrochemical cell within the assembly to a second portion of a reactant delivery conduit through an outer reactant flowpath that comprises an outer reactant inlet and an outer reactant outlet that is in fluid communication with an interstitial space that is formed around the outer electrodes.

24. The method of claim 23, further comprising servicing the assembly by removing one of the electrochemical cells from the assembly without disturbing any other of the electrochemical cells within the assembly.

25. The method of claim 23, further comprising increasing a power out capability of the assembly by adding one of the electrochemical cells to the assembly without disturbing any other of the electrochemical cells within the assembly.

26. The method of claim 25, further comprising placing a cross-interconnect to provide one or the other of series and parallel electrical connection between adjacent electrochemical cells.

* * * * *